United States Patent [19]

Ridderstolpe

[11] Patent Number: 4,687,213
[45] Date of Patent: Aug. 18, 1987

[54] WHEEL ASSEMBLY FOR TRAVERSING OBSTACLES

[76] Inventor: Carl J. Ridderstolpe, Tvetabergs gård, S-151 90 Södertälje, Sweden

[21] Appl. No.: 859,986

[22] PCT Filed: Sep. 24, 1985

[86] PCT No.: PCT/SE85/00220
§ 371 Date: Apr. 28, 1986
§ 102(e) Date: Apr. 28, 1986

[87] PCT Pub. No.: WO86/02052
PCT Pub. Date: Apr. 10, 1986

[30] Foreign Application Priority Data
Sep. 25, 1984 [SE] Sweden ............................ 8404792

[51] Int. Cl.⁴ .................... B62B 5/02; B62D 61/00
[52] U.S. Cl. ................................................. 280/5.26
[58] Field of Search ............ 280/5.26, 5.28, 5.22, 280/5.2; 180/7.1, 8.2, 9.22

[56] References Cited

U.S. PATENT DOCUMENTS

| 1,887,427 | 11/1932 | Porcello | 280/5.28 |
| 2,786,540 | 3/1957 | Sfreeda | 180/7.1 X |
| 2,928,501 | 3/1960 | Ramirez | 280/5.22 |
| 3,058,754 | 10/1962 | Whitaker | 280/5.26 |
| 3,269,741 | 8/1966 | Porcello | 280/5.26 |
| 3,638,745 | 2/1972 | Floyd | 180/8.2 |
| 4,457,526 | 7/1984 | Persson | 280/5.26 |

Primary Examiner—John A. Pekar
Attorney, Agent, or Firm—Sughrue, Mion, Zinn, Macpeak and Seas

[57] ABSTRACT

A wheel assembly comprises at least two wheels (9) rotatable along a contact surface (2) and equally spaced on a carrier member (8) movably connected with a frame, e.g. a portion of a wagon body, a vehicle chassis, a container or a conveyor. The invention makes it possible for the frame to continue to move horizontally without any vertical changes when the wheels (9) pass over irregularities (12) on the contact surface. The carrier member (8) is continuously movable in a plane which, in principle, is perpendicular to the contact surface. Circular support members (13), concentric with the wheels, cooperate with support surfaces on the frame.

10 Claims, 12 Drawing Figures

WHEEL ASSEMBLY FOR TRAVERSING OBSTACLES

BACKGROUND OF THE INVENTION

The present invention relates to a wheel assembly of the type comprising at least two contact members which are rotatable along a contact surface and equally spaced on a carrier which is movably connected to a frame, e.g. a portion of a wagon body, a vehicle chassis, a container or a conveyor for the purpose of moving the frame relatively the contact surface.

The problem solved by prior art assemblies of the type above defined has been to make it possible to pass upwards or downwards on stair steps. In other words, the prior art devices have been designed to "climb" up or down the stairs and, more specifically by rotation of the carrier relative to the frame in such a way that two of the wheels mounted on the carrier are in simultaneous contact with the horizontal surfaces of at least two of the stair steps. The technical problem solved by such devices was consequently a conversion of the discontinuous, jerky movement into a smoother and more continuous movement, the ideal aimed for being a trajectory parallel to the tangent through the outer corners of the steps.

SUMMARY OF THE INVENTION

The present invention solves a problem which could be stated to be diametrically opposed to the one just mentioned. The object of the invention is not to make possible or facilitate a movement in a direction having vertical components. Instead, it is to make it feasible to move, normally horizontally, the frame of the wheel assembly along a contact surface without any change of the level of the frame above the contact surface in spite of the fact that the latter is not planar but has upwardly directed projections or similar obstacles.

The above object has, according to the main feature of the invention, been realized in that the carrier member is continuously movable in a plane which is at least substantially perpendicular to the contact surface. Further, circular, preferably rotatable, support members are concentric with the contact members and are arranged to cooperate with support surfaces on the frame such that the distance of the latter from the contact surface is maintained at least essentially constant independently of the possible presence of projections therefrom which may be accomodated in the space between the support surface and those of the contact members which, in any given instant, are in contact with the contact surface. Some embodiments of the invention will now be described, reference being made to the accompanying, diagrammatic drawing.

BRIEF DESCRIPTION OF THE DRAWINGS

FIG. 4 is a perspective view showing a wheel assembly, mainly according to FIGS. 1 and 2, which is steerable in relation to a wagon chassis or the like.

DETAILED DESCRIPTION OF THE PREFERRED EMBODIMENTS

Figure 1:
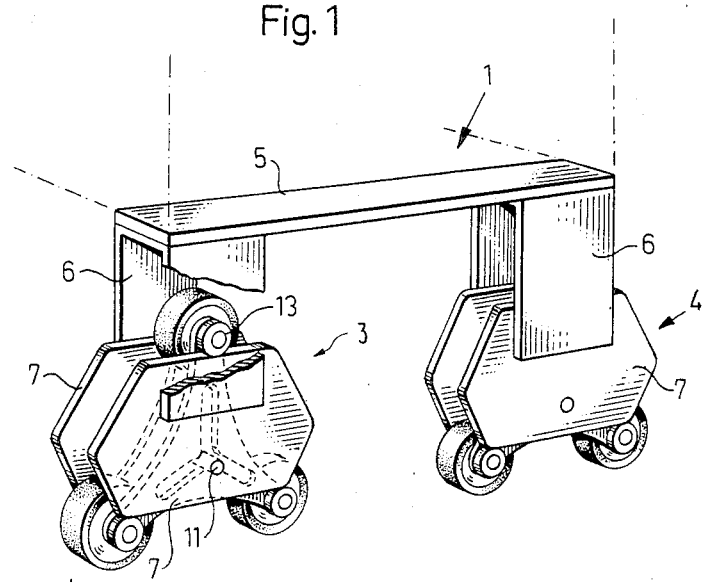
FIG. 1 is a, partly broken, perspective view showing a wheel undercarriage consisting of two wheel assemblies according to a first embodiment.

According to the embodiment shown in FIGS. 1 and 2 a bogie 1 constitutes a portion of e.g. a wagon body or a vehicle chassis which in FIG. 1 has been indicated with dash-dot lines and which shall move along a horizontal contact surface 2 shown in FIG. 2. The bogie consists of two wheel assemblies 3 and 4 interconnected by a bar 5 which at both ends has a fork 6. To each of the two fork legs there is fastened a plate 7 which, according to the embodiment illustrated, is an irregular hexagon. Its upper and lower sides are horizontal whereas the other four sides are substantially inclined in relation to the horizontal plane. The operational significance of that layout will be explained below.

Each pair of opposite plates 7 forms the frame of the related wheel assembly. Between the two plates there is a member 8, the contour lines of which, according to the present embodiment, form an essentially equilateral triangle and which, at each of its three corners, supports a rotatable contact member 9 in the form of a wheel, a roller or the like. In each of the three legs of carrier member 8 there is a slot 10 extending from the center towards the adjacent corner. Carrier member 8 consists of two parallel, triangular members but it may also take other forms, e.g. a central plate having fork-like corner sections for wheels 9. Slots 10 are traversed by a shaft 11 the ends of which are secured to plates 7. It is to be understood that instead of through slots 10 there could be used groove-like recesses engaging short pivot shafts. However, irrespective of the detailed structure of the assembly its basic mode of operation is as follows.

On the contact surface 2 there is an obstacle 12 over which the assembly must pass. According to the invention this can occur without any change of the level of bogie 1, implying the realization of one or both of the following two advantages.

Presume that the wheel assembly carries a wagon body or a platform with a heavy load. If, according to the prior art, the passage of each wheel over the obstacle implies that the load must first be lifted and then lowered a vertical distance equal to the height of the obstacle there is required the performance of a work which must be supplied by the prime mover generating the drive force. Consequently, even if the corresponding force requirement is rather low, as is the case at a purely horizontal passage, the engine must be overdimensioned in order to handle also the, per se completely unproductive, vertical displacement of the load. The possibility thanks to the invention to avoid such an overdimensioning is one basic advantage of the invention.

The second advantage is related to the fact that the vertical movement is not only undesired but in several connections directly detrimental, namely when, due to the nature of the load transported, it is important to protect it from vertical acceleration forces or bumps. FIGS. 2A-2F explain how both those advantages are obtained.

Figure 2A:
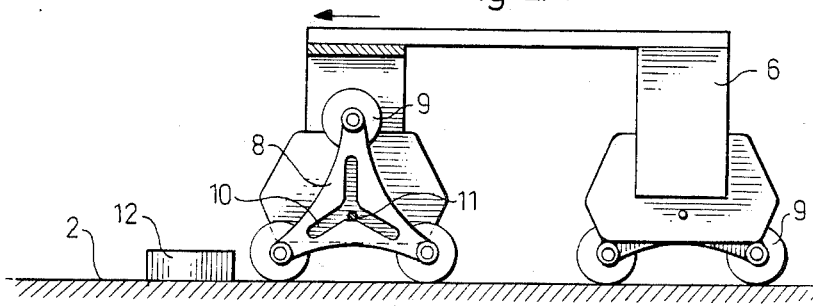
FIGS. 2A-2F are lateral views illustrating the principle of operation of the undercarriage in FIG. 1. The foremost wheel assembly, as seen in the direction of movement, is shown partly in section.
Figure 2B:
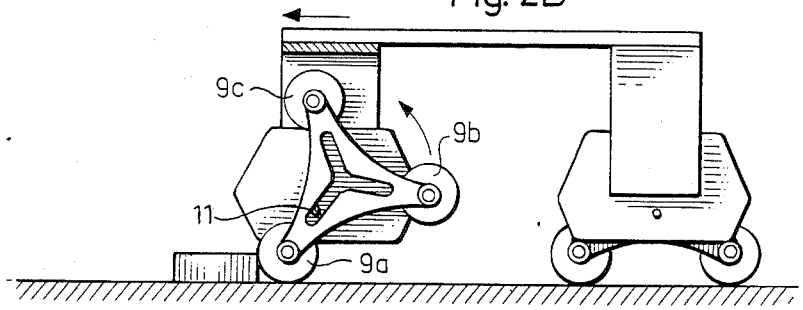

In FIG. 2A the foremost wheel assembly is located just in front of the obstacle 12. When the foremost of wheels 9 hits the obstacle—FIG. 2B—a reactional force is via that wheel transmitted to carrier member 8. That force generates a torque symbolized by the arrow in FIG. 2B which causes the carrier member to turn around that wheel, 9a. This turning movement can take place without any accompanying vertical movement due to the fact that shaft 11 engages slot 10 at wheel 9a. Because the propulsion force continues to act the horizontal movement of the bogie will continue, meaning that plates 7 will be displaced horizontally relative to the stationary wheel 9a. The rotational shafts of all wheels do at their ends have support or guide means in the form of small rollers 13 which in this case are rotatable and which exert a supporting and/or guiding action in cooperation with the edges of plates 7. In the position shown in FIG. 2B the lower edge of plate 7 performs a rolling movement over the roller 13 of wheel 9a. The roller of wheel 9b, in cooperation with shaft 11, controls the turning movement of carrier member 8 by rolling along the two trailing edges of plate 7.

Figure 2C:
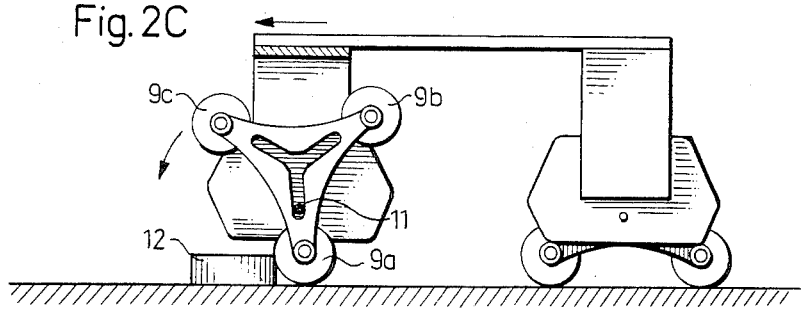

In the position shown in FIG. 2C wheel 9a is about midway along the lower edge of plate 7 whereas wheel 9b is entering the guiding surface formed by the upper horizontal edge of the plate. The third wheel, 9c is on its way downwards along the forward guiding edges of plate 7. In that position shaft 11 is located adjacent the end of the slot which is directed towards wheel 9a.

Figure 2D:
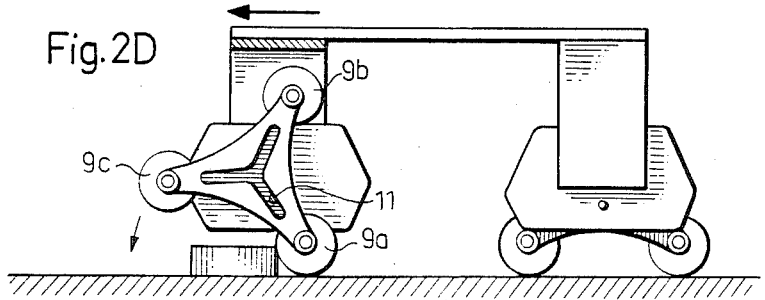

In FIG. 2D the relative movement between the shaft and the slot is in the opposite direction so that shaft 11 now approaches the common center of the slots. Wheel 9c is located at the level where the two inclined front edges of plate 7 meet.

Figure 2E:
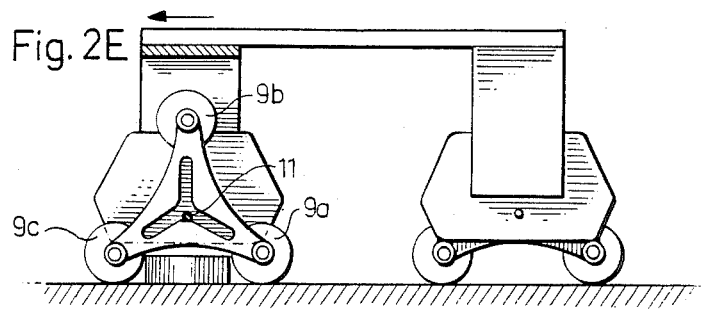

In FIG. 2E the obstacle has been passed in the sense that one of the wheels, 9c, is now in front of the obstacle in the direction of travel and in contact with the horizontal surface 2. FIG. 2E also shows that, in the case illustrated, obstacle 12 has the maximum size which the assembly can handle without transmitting any vertical movements to the frame. The corresponding size criteria are that the extension of the obstacle in the direction of travel must not be so great that the obstacle cannot be housed between the two wheels, here 9c and 9a, which straddle it. Also, the height of the obstacle must not be so great that there is contact between the obstacle and the carrier member 8 or plate 7. Finally, it should in relation to FIG. 2E be noted that shaft 11 has assumed the same position relative to carrier member 8 as in the starting position shown in FIG. 2A.

Figure 2F:
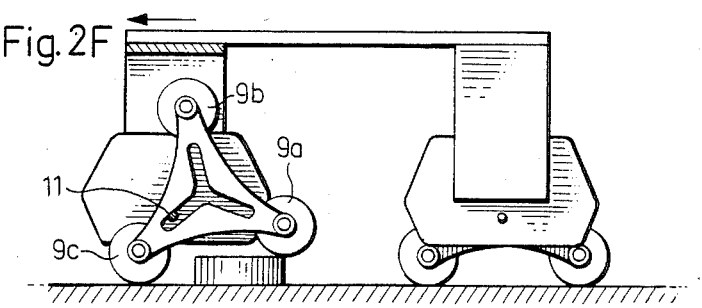

In FIG. 2F roller 13 on the shaft of wheel 9c has started along the lower horizontal support surface of plate 7 and wheel 9a has been lifted up on the obstacle 12 which has been made possible thanks to the fact that carrier member 8 now turns around the shaft of wheel 9c. As is seen, shaft 11 now engages the slot directed towards wheel 9c. When the rear wheel assembly of the bogie reaches obstacle 12 the function above described is, of course, repeated. It should however be observed that the invention can be worked with any number of interconnected wheel assemblies and that such an interconnection, if any, may have the form of a bogie or any other device.

Figure 3:
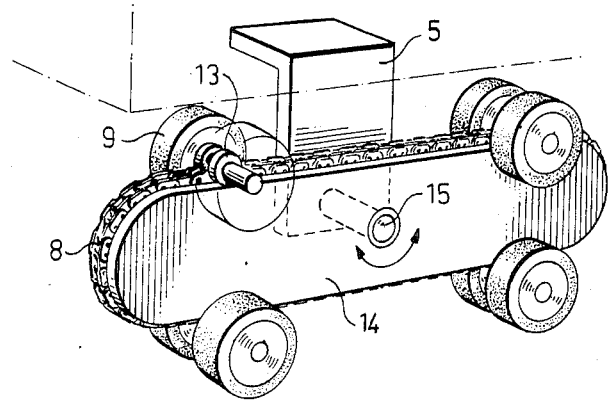
FIG. 3 is a perspective view showing a second embodiment.

According to the embodiment shown in FIG. 3 the wheel assembly is attached via a bracket 5 to a wagon body or the like and frame 14 is an elongated rectangle with semicircular ends. It is surrounded by a carrier member 8 in the form of an endless chain carrying equally spaced wheel shafts with wheels 9 and support rollers 13. In this case each wheel shaft carries two wheels which, as seen in the axial direction of the shafts, are located outside instead of inside the support rollers 13. The number of wheel pairs is four according to the embodiment shown but may be arbitrarily chosen. Frame 14 is connected to bracket 5 by a central shaft 15 around which the wheel assembly may turn. However, this is not a requirement for the realization of the mode of operation characterizing the invention. It is understood that when the front wheel pair of such an assembly encounters an obstacle it will be halted behind it, the propulsion force causing chain 8 to move along the circumference of frame 14 until the next wheel pair rests against the contact surface in front of the obstacle. When chain 8 has moved all of the wheel pairs to the last-mentioned position the obstacle has been passed.

Figure 4:
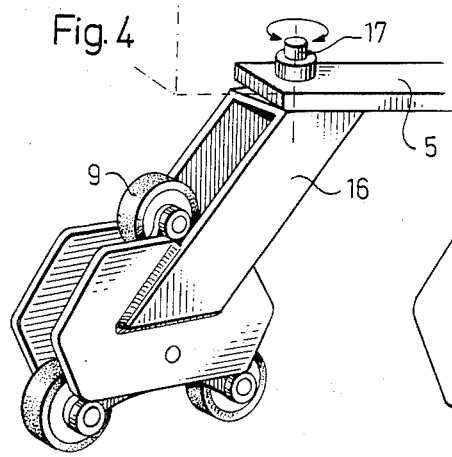

In some applications it is advantageous to make the wheel assembly steerable. The steering may be positively controlled or occur according to a swivelling principle. The last-mentioned application is shown in FIG. 4 where the wheel assembly, in contrast to the embodiment in FIGS. 1 and 2, has an inclined fork 16 connected to bar 5 by means of a pivot shaft 17.

Figure 5A:
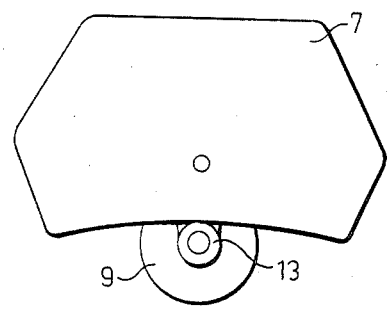
FIGS. 5A-5C illustrate three different ways of stabilizing the rotational position of the carrier member during intervals when the assembly does not pass over any obstacles.
Figure 5B:
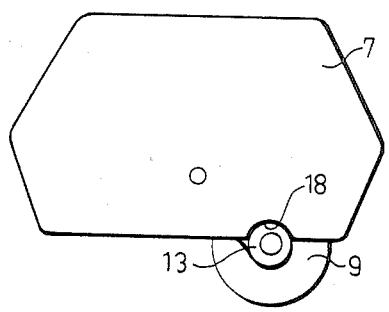

The steering function is facilitated if, during the steering movement, only one wheel of each wheel assembly contacts the contact surface. FIGS. 5A and 5B illustrate two different ways of realizing that function. Both those methods are based on the use of gravitational force. According to FIG. 5A the lower edge of plate 7 is slightly concave whereby roller 13 and, hence, wheel 9 tends to assume and remain in a centered position. This naturally means that the wheel assembly cannot pass over obstacles without any vertical movement. However, the vertical displacement corresponding to the slightly concave form is in most applications negligible in comparison to the height of the obstacle—in the drawing the concavity has been exaggerated for the sake of clarity.

Acccording to the embodiment in FIG. 5B there is in the horizontal lower edge of plate 7 a recess 18 for roller 13. Also in this case the size of the recess has not exaggerated.

Figure 5C:
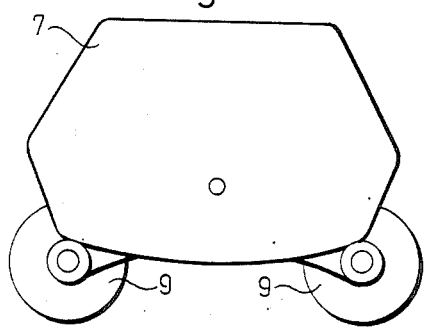

In other applications there may exist an opposite requirement, namely that, during the passage of the wheel assembly along the contact surface between two obstacles, two of the wheels must always simultaneously be in contact with the surface. One way of satisfying that condition is to make the lower surface of frames 7 slightly convex as shown in FIG. 5C. Another possibility is to select an embodiment of the general type illustrated in FIG. 3. It is understood that such an assembly can be modified so that an arbitrary number of wheels are in simultaneous contact with the rolling surfce. A further advantage of such embodiments is the moderate height which is of importance in applications where the belly clearance is small, e.g. at pallet loaders.

Generally, it should be underlined that the embodiments of the invention here shown and described are intended to clarify the inventive concept only meaning that they may be modified or supplemented in various ways. One such possibility is to provide the assembly with positively driven wheels 9 which however calls for temporary fixation of the carrier members. The applications of the invention now considered of special interest are those where a unit having wheel assemblies may pass along a surface having vertical projections or obstacles in the form of e.g. thresholds, pipes, hoses or the like. It must however be observed that the invention can be applied also in the opposite situation, when the underlying surface is completely planar but the units transported have an irregular lower surface. Such applications include conveyors transporting boxes the lower bottom surfaces of which have cross-bars or other irregularities.

I claim:

1. A wheel assembly, comprising at least three wheel members (9) which are rotatable along a contact surface (2) and equally spaced on a carrier member (8) which is movably connected with a frame (7; 14), e.g. a portion of a wagon body, a vehicle chassis, a container or a conveyor, the frame (7; 14) being displaced relative to the contact surface, characterized in that the carrier member (8) is continuously movable in a plane substantially perpendicular to the contact surface, a plurality of circular support means (13) concentric with the wheel members (19) and individually associated therewith, said support means engaging support surfaces on the frame such that the distance between the frame and the contact surface (2) is maintained substantially constant independent of irregularities (12) projecting from the contact surface and having a maximum length equal to the distance between any two (9a, 9c) of the wheel members simultaneously in contact with the contact surface (2).

2. A wheel assembly according to claim 1, wherein each carrier member (8) is rigid, has its greatest dimension in its plane of movement and, counted in that plane, has its wheel members (9) equally spaced from the center of the carrier member and located at equal mutual angular distances.

3. A wheel assembly as claimed in claim 2, wherein each carrier member is connected ot its frame (7) such that, relative to said frame, it may in said plane of movement carry out both a rotational and a transitional movement.

4. A wheel assembly as claimed in claim 3, wherein the connection between each carrier member (8) and its frame (7) comprises a member (11) rigidly secured to the frame and engaging guiding means (10) of the carrier member which guiding means are symmetrical relative to the wheel members (9).

5. A wheel assembly as claimed in claim 1, wherein each carrier member comprises a chain (8) movable along the circumference of an associated frame (14).

6. A wheel assembly as claimed in any of the preceding claims and swingable around a vertical shaft (17), wherein a portion of the support surface of each frame (7) adjacent the contact surface is slightly concave or exhibits a shallow recess (18) for stability during a turning movement of one of the wheel members in a predetermined position on said portion of the support surface.

7. A wheel assembly as claimed in any of claims 1–5, wherein a portion of the support surface of each frame adjacent the contact surface (2) is slightly convex for stabilizing two of the wheel members (9) in simultaneous contact with the contact surface.

8. A wheel assembly as claimed in any of claims 1–4, wherein the support surface of a frame (7) comprises an upper portion limiting the degree of freedom of the carrier member (8) in a direction towards the contact surface (2).

9. A wheel assembly as claimed in claim 1, further comprising means for temporarily preventing rotation of the wheel members (9).

10. A wheel assembly as claimed in claim 1, further comprising means for preventing rotational movement of the carrier members (8).

* * * * *